INVENTOR.
WALTER H. VAN DEBERG
BY
Ralph L. Tweedale
ATTORNEY

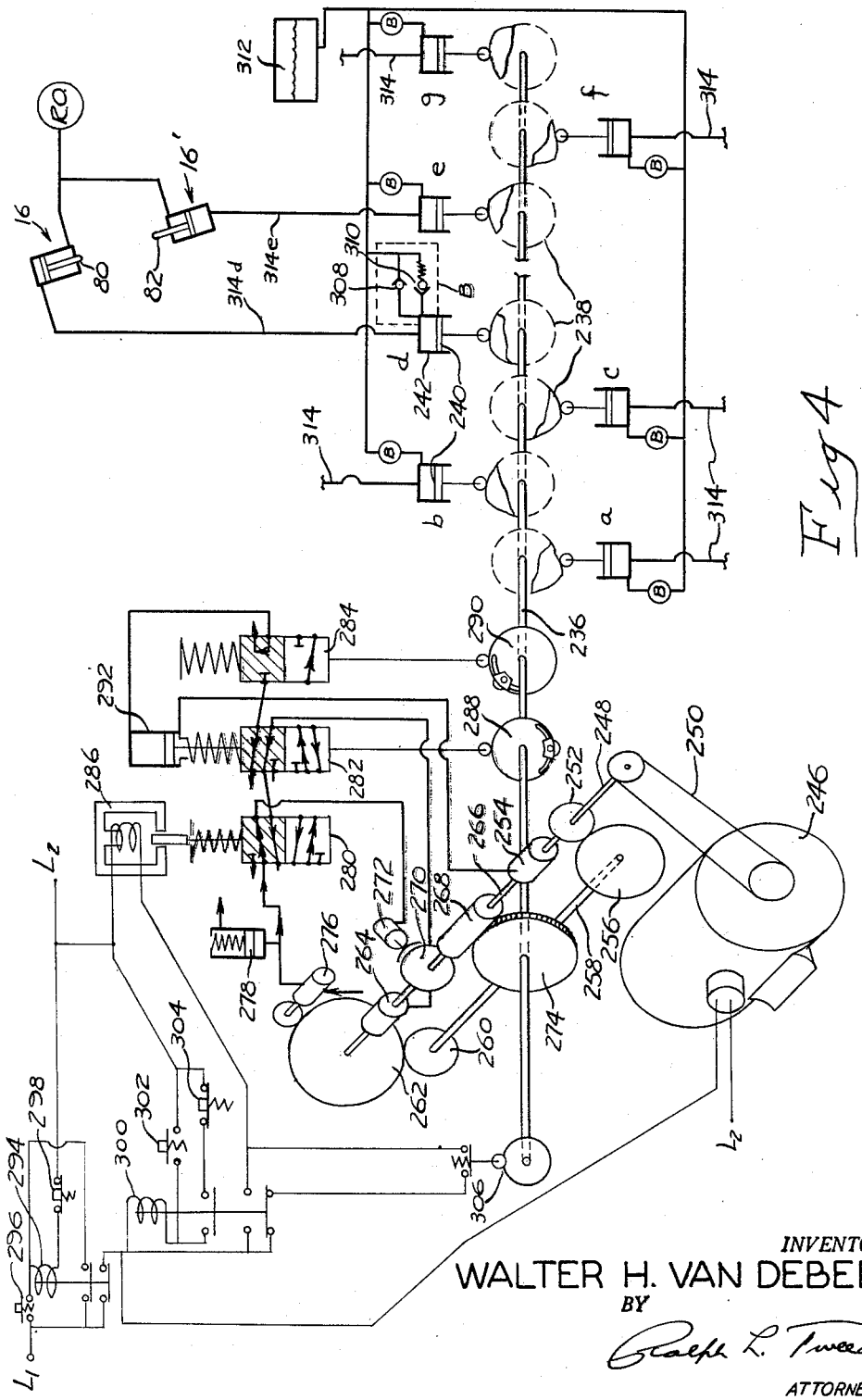

United States Patent Office 3,150,439
Patented Sept. 29, 1964

3,150,439
INDEXING MACHINE TOOL
Walter H. Van Deberg, Ferndale, Mich., assignor to The Thompson Company, Ferndale, Mich., a co-partnership
Filed May 19, 1960, Ser. No. 30,336
8 Claims. (Cl. 29—38)

This invention relates to automatic machine tools and more particularly to multiple station machines having an indexing carrier or group of platens with a series of work manipulating devices thereon to be operated such as fixtures for internally gripping drilled or apertured workpieces on a rotary type index table and holding them with extreme accuracy and carefully controlled pressure.

In high production machining operations, where a workpiece must be placed on an index table, precisely oriented, rigidly clamped or otherwise manipulated in the oriented position, indexed to another station where a work operation is performed, indexed to another station and unclamped, and eventually removed from the table, the gripping devices currently available are not entirely satisfactory. Many such manipulating devices are independently actuated and consequently are characterized by a lack of uniformity in gripping pressure; this, of course, results in the undesirable effect of disorientation of loosely gripped workpieces and injury to ones clamped with excessive pressure or clamped at the wrong instant during the orienting operation. In an effort to overcome this undesirable result, designers have utilized complicated hydraulic or electrical solenoids actuated gripping devices which, because of their complexity, sacrifice accuracy in the positioning of the work piece. Where precision machining operations are to be performed, extreme accuracy is mandatory in locating the workpiece at a given instant in relation to table indexing movement.

Accordingly, it is an object of the present invention to provide workpiece handling apparatus for an index member which positions the workpiece with extreme accuracy and also exerts a uniform clamping pressure on every workpiece through a mechanical self-locking connection throughout the time the workpiece is gripped.

Another object of the invention is to provide an expanding chuck type gripping device for manipulating a workpiece by means of a cavity or aperture and which is rugged in design to accurately clamp workpieces through a long and useful life.

A further object is to provide a plurality of identical work manipulating devices on an indexing carrier which are all actuated by a single mechanism off the carrier to obtain uniformity in the actuation.

A further object is to provide a plurality of work manipulating devices on an indexing carrier all operated in timed coordination with table movement by means of a rotary cam actuated liquid column type power and control device.

Further objects and advantages of the present invention will be apparent from the following detailed description, with reference to the accompanying drawings in which like reference characters refer to the same parts throughout the several views, and in which:

FIGURE 4 is a view in schematic fashion of the mechanico-hydraulic power and control device of this invention.

Figure 1:
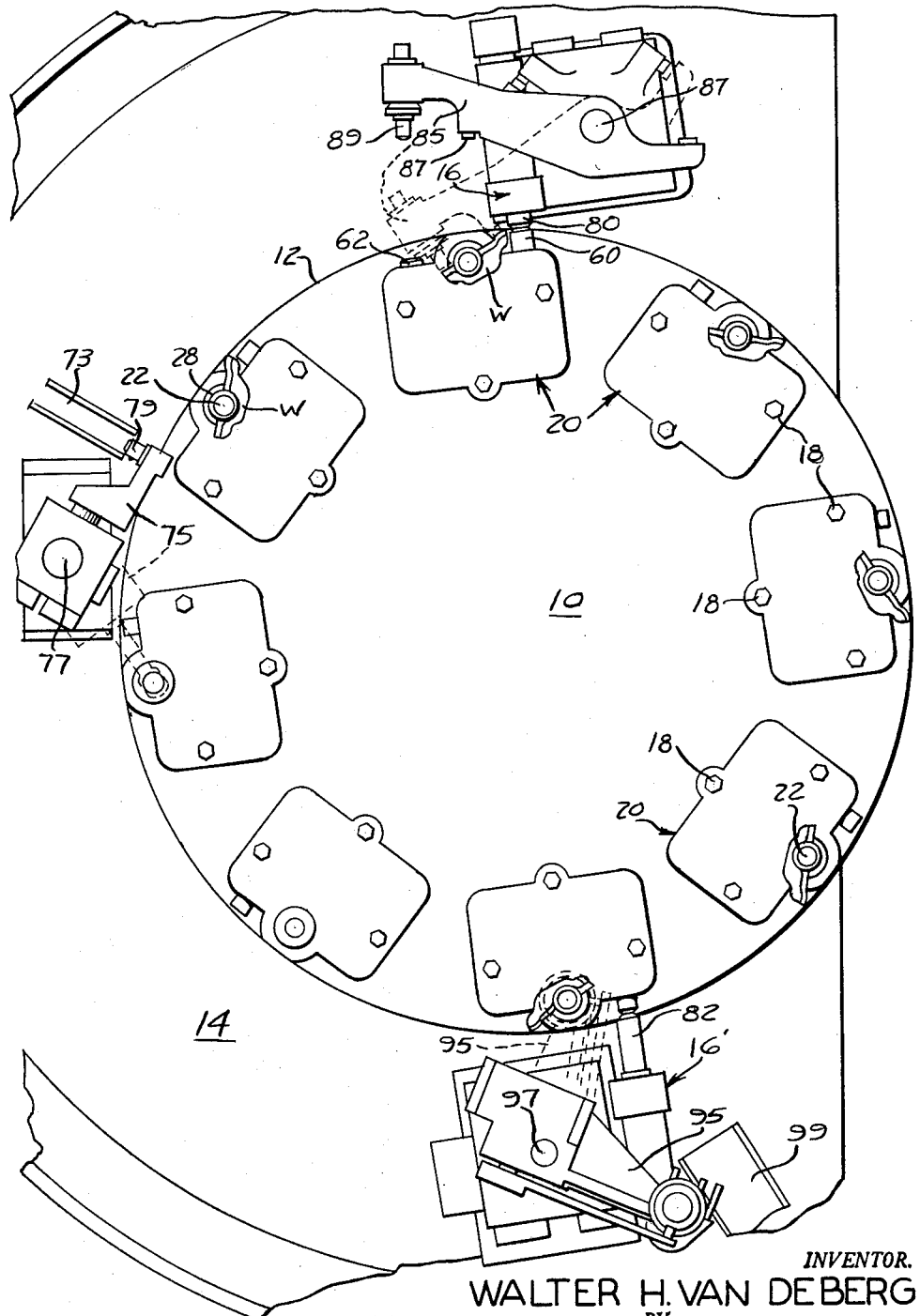
FIGURE 1 is a plan view of a rotary type indexing table supporting a plurality of the clamping units of this invention.

In FIGURE 1, a machine tool of the multiple-station type is shown including a rotary indexing table 10 having a circular peripheral edge 12 supported for intermittent angular indexing motion on a stationary main frame or base 14. Located also on the base 14 near the table periphery at least two different stations are pusher means 16, 16' for actuating te gripping unit in a manner later to be described. Rigidly supported by suitable means such as bolts 18 on the upper surface of the index member 10 near its periphery are a plurality of workpiece gripping or handling units 20.

Figure 2:
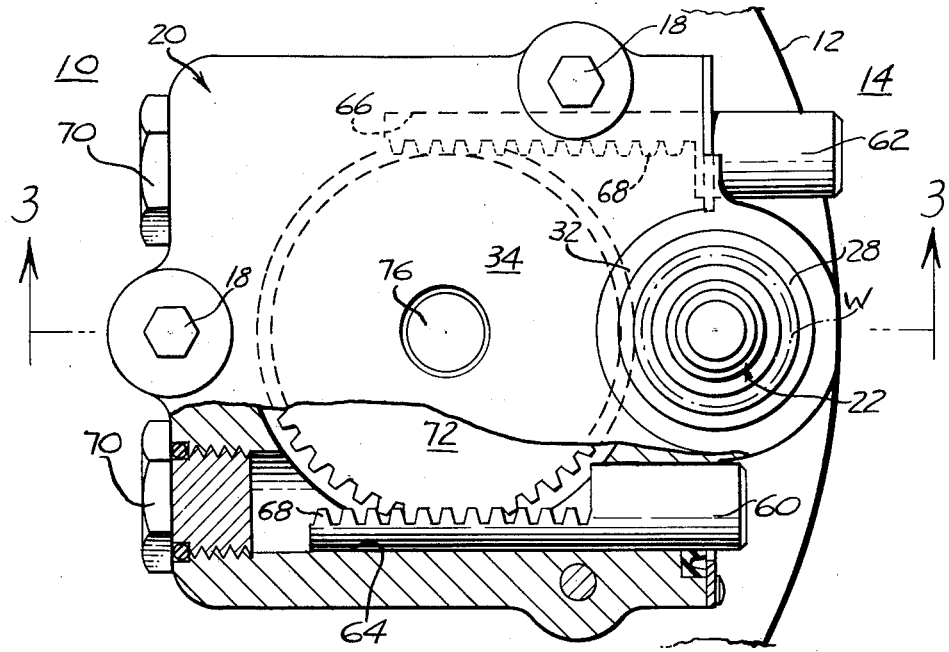
FIGURE 2 is an enlarged plan view of a clamping unit with parts broken away.
Figure 3:
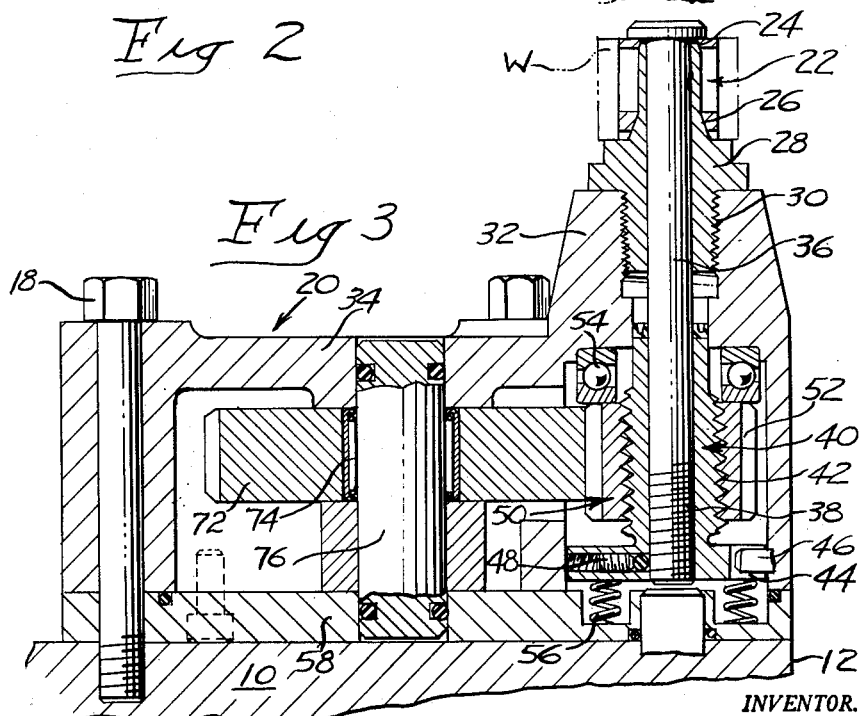
FIGURE 3 is a sectional elevational view taken on line 3—3 of FIGURE 2 showing the details of construction of the clamping unit.

Regarding specifically FIGURES 2 and 3, each clamping apparatus 20 is adapted to grip a workpiece W having an aperture therein by means of an expanding chuck or collet 22 of standard design. The work handling chuck 22 of each fixture 20 is designed to move between two positions to manipulate the workpiece: to contract in its natural unstressed condition and to expand by being forced upon inclined upper and lower non-locking wedge surfaces 24, 26 respectively of a combined support and wedge insert member 28 threaded in a tapped hole 30 in an upstanding nose portion 32 of the housing 34 of each unit 20. It will be obvious that various sizes and shapes of workpiece handling chucks and cooperating wedge insert members may be utilized to accommodate a variety of workpieces, and the particular ones shown should in no sense be taken as limiting but merely as exemplary illustrations.

To expand the chuck 22 for gripping a workpiece, it is pulled down against the wedge insert 28 by means of a headed draw bar 36 which is made rigid at its lower pulling end, by means such as screw threads 38 locked by a suitable set screw 48, with a sliding member 40 having accurately cut screw threads 42 of a self-locking angle around its periphery. A key way 44 in the flanged lower end of the sliding member 40 embraces a key 46 secured in the until housing 34 to hold the sliding member 40 against rotation. Thus the draw bar 36 coupled with the externally threaded sliding member 40 is in effect a traveling lead screw arrangement which draws the chuck 22 down against the wedge portions 24 and 26 for purposes of expanding the chuck to grip a workpiece.

Travel of the lead screw 40 and its associated draw bar 36 is caused by an oscillated member 50 which has internal threads mating with the threads 42 of the lead screw, and externnal gear teeth 52 by means of which the mmeber 50 may be oscillated. The oscillating pinion member 50 of the screw thread device is prevented from moving upwardly when it exerts downward pressure on the draw bar 36 by a caged thrust bearing arrangement 54 set in the unit housing 34 permitting only rotational movement of the nut 50. When the oscillating nut-pinion member 50 is not exerting downward pressure on the draw bar 36, the bar is urged upwardly by springs 56 to allow the chuck 22 to contract and release the workpiece. The springs 56 are set in a suitable cavity in a base cover plate 58 which excludes dirt, water, grit and other contaminants from the interior of the gripping unit.

Oscillating member 50 is moved by shiftable means on the table within the housing 34 of the manipulating fixture. In the current embodiment, this shiftable means comprises a pair of oppositely reciprocable plungers 60, 62 slidable respectively in bores 64, 66 in the housing 34 and each including a rack composed of opposed teeth 68. The plungers extend at one end beyond the confines of the fixture housing 34. The bores 64, 66 are closed at the other end by plugs 70 and are arranged horizontally parallel to a radial line of the table 10. For the purpose of spacing the plungers 60, 62 a desired distance apart, the racks 68 of the plungers do not mesh directly with the teeth 52 of the oscillating pinion-nut member 50, but are linked therewith by a large idler or spacer gear 72 journalled on roller bearings 74 about a central shaft 76 secured within the housing 34 and the lower cover plate 58. Teeth on the opposite diameters of the large pinion 72 mesh with the rack teeth 68 of the two plungers, and the teeth of the gear 72 also mesh with the teeth 52 of the oscillating member 50. Thus, it is clear that movement of the lower plunger member 60 to the left in FIGURE 2 will rotate the gear 72 in a clockwise direction to in turn rotate the oscillating nut member 50 in a counterclockwise direction which serves to exert a downward pull on the draw bar 36 to expand the work-handling device 22. As the gear 72 is rotated clockwise by the left hand motion of lower plunger 60, plunger 62 is of course racked to the right to a position in which it extends outside the housing 34 of the unit 20 and beyond the edge 12 of the table 10. Conversely, motion of the plunger 62 to the left will move plunger 60 to a position extended beyond the housing 34 and will relax downward pressure on the draw bar 36 allowing springs 56 to urge the draw bar upwardly for releasing a workpiece. The length of stroke of the plunger 60 accurately determines the amount of expansion which will be imparted to the chuck 22.

In order to obtain an identical stroke for each plunger 60 and thus identical manipulation by all of the gripping units 20, a single operator or pusher member is used. The pusher member 16 may be a standard double acting fluid motor of the shiftable piston type in which the piston rod 80 has a stroke which may be closely controlled by suitable adjustable limit stops (not specifically shown) built into the fluid motor. The piston rod 82 of the pusher member 16' which moves the plungers 62 toward the center of the carrier to release a workpiece need not have its stroke as accurately determined.

For the purpose of giving coordinated motivation to the operating means for indexing the table and to the pusher members 16, 16' and for the work stations located on the base 14 there is provided a mechanico-hydraulic programming system for producing a cycle of coordinated movement, illustrated diagramatically in FIGURE 4. This system may be constructed as a self-contained unit having its own housing, not illustrated, which may be positioned at any convenient location on or adjacent the machine and connected to hydraulic cylinders by suitable flexible piping. The mechanico-hydraulic drive unit comprises a master camshaft 236 carrying a plurality of cams 238, the followers of which operate the transmitter pistons 240, each of which forms part of a liquid column type motion transfer device of which there are seven units shown in the diagram of FIGURE 4. Each piston reciprocates in a cylinder 242 having a head B which contains a suitable inlet replenishing check valve 308 and a high pressure relief valve 310 both of which communicate with a low pressure oil reservoir 312 preferably formed in a housing enclosing the drive unit.

For turning the camshift 236, a motor 246 drives an input shaft 248 of a two-speed transmission through a belt drive 250. The input shaft 248 drives a pinion 252 and also the input member of a hydraulically-engaged, spring-released clutch 254. Pinion 252 drives a gear 256 secured to a countershaft 258 which carries a pinion 260 at its opposite end. Pinion 260 drives a gear 262 and therewith constitutes a set of change speed gears. Gear 262 drives the input member of a second hydraulically-engaged, spring-released clutch 264. The driven members of clutches 254 and 264 are secured to the opposite ends of a shaft 266, having a worm 268 thereon and a brake drum 270. The latter has a spring-biased hydraulic motor 272 for engaging the brake. Worm 268 drives a worm wheel 274 secured to the master camshaft 236.

For the purpose of automatically controlling the starting, stopping, and speed of the transmission, there is provided a hydraulic control pump 276 driven from gear 262, which may circulate a body of oil contained in the housing surrounding the transmission. The pump 276 may deliver to a combined accumulator and relief valve comprising a spring loaded piston 278 and also supplies oil to a bank of control valves 280, 282 and 284. In the diagrams each valve is shown as a two-position valve, spring-biased to the position illustrated in which the connections shown in the cross-hatched rectangles are established. Single-headed arrows are used to indicate flow at reservoir pressure and double-headed arrows to indicate flow at pump delivery pressure. Each of the valves, when shifted, establishes the connections shown in the un-hatched rectangles immediately below the hatched rectangles.

Valve 280 is arranged to be shifted by a solenoid 286. Valves 282 and 284 are arranged to be shifted by the adjustable cams 288 and 290, respectively, which are positioned on camshaft 236. In addition, the valve 282 has a hydraulic holding cylinder 292 which holds the valve 282 in its shifted position until it is released by the shifting of valve 284. Valve 280 in the position shown delivers pressure fluid to engage the brake 272 and also exhausts fluid to release the low speed clutch 264. When shifted, valve 280 exhausts fluid to release brake 272 and supplies pressure fluid to engage the low speed clutch 264, subject, however, to a conjoint control by the valve 282.

The latter valve, in the position illustrated, exhausts fluid to release the high speed clutch 254 and places the low speed clutch 264 under the control of valve 280. In its shifted position, valve 282, provided valve 280 has been shifted, delivers pressure fluid to engage high speed clutch 254 and exhausts fluid to release low speed clutch 264. As previously explained, the valve 284 is merely a reset valve for bypassing the holding cylinder 292 to permit valve 282 to return to its spring biased position shown in the drawings.

Thus, energization of solenoid 286 will start the camshaft rotating at slow speed. Thereafter, the cam 288 will shift the transmission to drive the camshaft at high speed, and still later the cam 290 will again shift the transmission to slow speed. So long as the solenoid 286 remains energized, the camshaft 236 will continue to rotate, first at a slow speed and then at a high speed during each revolution, controlling its own speed changes by operation of the cams 288 and 290.

For the purpose of controlling the drive motor 246 and solenoid 286, there is provided an electric control circuit connected between a pair of electric supply lines, designated L1 and L2. The circuit may include a master relay 294 of the holding type having a manual master start switch 296 and a manual master stop switch 298. Relay 294 controls the motor 246 and also a cycle control relay 300 of the holding type having a manual cycle start switch 302 and a manual cycle stop switch 304. The normally open contacts of relay 300, which are of the make-before-break type, control energization of cycle solenoid 286 directly. The normally closed contacts of relay 300 also control solenoid 286, but are in series with a cam switch 306 on the end of the camshaft 236 and arranged to be opened once during each revolution thereof. The arrangement is such that when the cycle stop switch 304 is operated at any point in the rotation of camshaft 236, relay 300 will be de-energized, but solenoid 286 will remain energized until cam switch 306 opens at the predetermined stopping point. Operation of the master stop switch 298, however, will deenergize solenoid 286 immediately, regardless of the point in the cycle and will also de-energize motor 246.

The camshaft 236 as previously mentioned drives a number of cam operated hydraulic pulsator sections designated a through g, inclusive. Each section may comprise units duplicating the single acting pulsating cylinder 242, the head of which contains the replenishing check valve 308 and the spring closed relief valve 310. All the replenishing and relief valves are connected to a common oil reservoir 312 formed in the housing of the unit. The reservoir 312 is preferably subjected to a low, superatmospheric pressure by a body of compressed air or other pressure maintaining arrangements. Check valves 308 allow flow from the reservoir 312 to the cylinder 242, while relief valves 310 allow flow oppositely when the cylinder pressure exceeds a certain value. Thus each of the pairs of valves 308 and 310 may be referred to as a balancing valve and serve to balance the volume of fluid in each of the liquid column sections, as will be later described.

The pulsator sections *a, b, c, f* and *g* are connected by closed liquid column lines 314 with the motors (not shown) for indexing the table, loading workpieces on the supports 28, orienting the workpieces thereon, powering and controlling work performing stations, and unloading workpieces from the table to a discharge chute 99. The sections *d* and *e* are connected by closed liquid columns 314*d* and 314*e* with the fluid motors at stations 16 and 16′; respectively, for operating the pusher members 80 and 82.

In order to insure proper synchronization of the driving and driven elements of each pulsator section, it is desirable to provide slightly more fluid displacement in the driving or transmitting elements 240–242 than is present in their respective fluid motors at the opposite end of the liquid column line. Thus at the end of each advancing stroke of the transmitter piston 240, a small amount of fluid will be discharged to reservoir 312 through its relief valve 310. This amount plus any amount lost by leakage will be returned to the liquid column at the end of the return stroke by the operation of the replenishing valve 308.

In FIGURE 4 there is shown a circle marked RO connected to the end of the motive cylinders opposite the liquid column connections. This symbol designates the return oil connection by means of which a pulsator system may be hydraulically biased so as to maintain the follower in close contact with the cam as the falling portion of the cam contour recedes from the follower. The contours of the individual cams 238 are likewise not illustrated in a specific detail since they may be formed in accordance with the usual practice to cause motivation of each of the respective hydraulic motors in accordance with the particular operating cycle desired for the ma-machine. Likewise the speed ratio between the high and low speeds of the cam shaft 236, and the duration of the high speed portion of the cycle, may be selected as desired through use of the appropriate change gears 260–262 and through the adjustment of the cams 288 and 290, if desired. Of course, the two speed feature of the transmission may be omitted and the high speed clutch 254, the cams 288 and 290 and the valves 282 and 284 eliminated.

In operation, workpieces having an aperture may be positioned around a chuck 22 during intermissions in table motion by a suitable loading arm 75 pivoted on the frame at 77 and powered and controlled by pulsator sections *a* and *b*. A spring-loaded ball type internal gripper 79 on the loading arm 75 may receive a workpiece from a chute 73 and hold it during arm travel about axis 77 and also through 90° of travel about the longitudinal axis of the arm, whereupon a plunger (not shown) may move the workpiece downwardly from the gripper 79 onto the chuck 22. The workpieces will then be supported loosely on the insert members 28 while the table is indexed by other pulsator sections to bring a workpiece adjacent the pusher member 16. At this point a suitable orienting arm mechanism 85 pivoted at 87 on the base 14 may swing by means of a fluid motor controlled by transmitter section *c* over the table 10 to accurately locate the workpiece for the work operation that is to be performed. A rigid locator abutment 87 on the arm will determine the position of one end of the workpiece (a rocker arm for an automotive internal combustion engine is shown in FIGURE 1) while a spring-loaded abutment 89 urges the other end of the workpiece into position. With the arm 85 holding the workpiece in its proper oriented position, fluid powered piston rod 80 is extended in timed sequence by section *d* of the power and control unit to shift the plunger 80 toward the center of the table to operate a chuck and grip the workpiece with a carefully controlled amount of pressure. Upon retraction of the orienting arm 85 and gripper actuating rod 80, the table may again be shifted to present the workpiece sequentially to one or more working stations where operations such as pressing, punching, staking, shearing, marking, assemblying, drilling, milling, grinding and in fact any of the various operations utilized in high volume producton may be performed. When the desired operations have been performed on the workpiece, it is eventually shifted by the table to a station adjacent the rod 82 of pusher member 16′ which, under the control of section *e* of the drive unit, shifts plunger 62 toward the center of the table to break the self-locking engagement of the screw thread device and allow the chuck 22 to contract and release gripping pressure from the workpiece. In conjunction with this operation and at the same station, an unloading arm 95 pivoted on the frame 14 at 97 may lift the released workpiece from the support 28, swing it above the unloading chute 99, and then deposit it in the chute to complete the entire cycle.

Thus it will be seen that rugged, trouble free, long lasting gripping fixtures are provided for use on index machines which may be actuated with extreme accuracy by a single pusher member firmly associated with the base and controlled precisely by a rotary cam actuated liquid column type power and control unit. Furthermore, the chuck 22 is expanded to grip the workpiece with a closely controlled amount of pressure regulated in part by the rise of the cam at the appropriate pulsator section.

While the above described embodiment constitutes a preferred mode of carrying out this invention, many other forms might be adopted within the scope of the actual invention which is variously claimed as:

1. Workpiece gripping apparatus comprising a chuck for gripping a workpiece, a travelling screw fed wedge mechanism for operating the chuck, a rotating nut for causing travel of the screw which feeds the wedge mechanism, reciprocable means, motion transfer and conversion apparatus linking the rotating nut and the reciprocable means for converting rectilinear motion to rotary motion and transferring it from the reciprocable means to the rotating nut, and alternate pushers for imparting motion to the reciprocable means to rotate the nut in alternate directions for operating the chuck.

2. In a machine tool of the multiple-station indexing type the combination of a stationary main frame, a shiftable indexing member carrying a plurality of work manipulating fixtures, a work-handling member in each fixture movable between at least two positions, means on the frame engageable with each fixture in turn for moving the work-handling member while the indexing member is stationary, and a mechanico-hydraulic motivator comprising a common camshaft and a plurality of liquid column type motion transfer devices connected to operate both the indexing member and the means for moving the handling member in a coordinated program of movements.

3. In a machine tool of the multiple-station indexing type the combination of a stationary main frame, a shiftable indexing member carrying a plurality of work manipulating fixtures in a given direction, a work-handling member in each fixture movable between at least two positions, and abutment means on the frame shiftable in a direction transverse to the direction of fixture travel to engage with each fixture in turn for moving the work-handling member, and a mechanico-hydraulic motivator comprising a common camshaft and a plurality of liquid column type motion transfer devices connected to operate both the indexing member and the means for moving the handling member in a coordinated program of movements.

4. In a machine tool of the multiple-station indexing type the combination of a stationary main frame, a shiftable indexing member carrying a non-resilient self-locking force-multiplying workpiece manipulator, means mounted on the stationary frame for directly operating the manipulator after being shifted by the indexing member to a given station, and a common drive device connected to shift the indexing member as well as actuate the frame mounted manipulator operating means through a program of coordinated movements whereby the timing for the movements is predetermined by the common drive device.

5. In a machine tool of the multiple-station indexing type the combination of a stationary main frame, a shiftable indexing member carrying a plurality of workpiece manipulators, means mounted on the frame for operating the manipulators after being shifted by the indexing member to a given station, and a mechanico-hydraulic motivator comprising a common camshaft and a plurality of liquid column type motion transfer devices connected to shift the indexing member as well as actuate the manipulator operating means in a coordinated program of movements.

6. Workpiece gripping apparatus on a carrier moved past a plurality of stations comprising a workpiece gripper including a non-resilient self-locking mechanical actuator settable at any position within a given range, means off the carrier at one station for setting the gripper actuator at a desired position to positively grip a workpiece with a predetermined force and additional means off the carrier at another station for unsetting the gripper actuator to release the workpiece.

7. In a machine tool of the multiple-station indexing type the combination of a stationary main frame, indexing means mounted for shifting relative to the main frame, workpiece handling means carried by the indexing means, means mounted on the stationary frame for operating the handling means after being shifted by the indexing means to a given station, and a mechanico-hydraulic motivator comprising a common camshaft and a plurality of liquid column type motion transfer devices connected to shift the indexing means as well as actuate the operating means in a coordinated program of movements.

8. In a machine tool of the multiple station indexing type the combination of a stationary main frame, indexing means mounted for shifting relative to the main frame, workpiece handling means carried by the indexing means, the handling means including a self-locking force-multiplying mechanism for gripping workpieces, means mounted on the stationary frame for operating the self-locking force-multiplying mechanism after being shifted by the indexing means to a given station, and a mechanico-hydraulic motivator comprising a common camshaft and a plurality of liquid column type motion transfer devices connected to shift the indexing means as well as actuate the operating means in a coordinated program of movements.

References Cited in the file of this patent
UNITED STATES PATENTS

| | | |
|---|---|---|
| 1,157,310 | Klein | Oct. 19, 1915 |
| 1,962,567 | Lovejoy | June 12, 1934 |
| 2,002,938 | Dumser | May 28, 1935 |
| 2,966,361 | Phillips | Dec. 27, 1960 |